US 6,611,534 B1

(12) United States Patent
Sogabe et al.

(10) Patent No.: US 6,611,534 B1
(45) Date of Patent: Aug. 26, 2003

(54) STREAM DATA PROCESSING SYSTEM AND STREAM DATA LIMITING METHOD

(75) Inventors: Hideki Sogabe, Tokyo (JP); Yasuhiro Ishibashi, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/291,177

(22) Filed: Apr. 14, 1999

(30) Foreign Application Priority Data

Apr. 17, 1998 (JP) .......................................... 10-108119
Jan. 5, 1999 (JP) .......................................... 11-000498

(51) Int. Cl.⁷ ................................................. H04J 3/16
(52) U.S. Cl. ........................ 370/471; 370/392; 380/200; 713/182
(58) Field of Search ................................. 370/471, 465, 370/464, 475, 496, 484–487, 489, 490, 229, 235, 252, 389, 392, 395.1, 395.32, 474; 713/150, 155, 160, 161, 182; 380/201, 45, 239, 241, 200

(56) References Cited

U.S. PATENT DOCUMENTS 5,987,126 A  * 11/1999  Okuyama et al. ........... 380/203
6,141,483 A  * 10/2000  Yamada et al. ............... 360/27
6,198,875 B1 *  3/2001  Edenson et al. ............... 360/60
6,223,285 B1 *  4/2001  Komuro et al. ............. 380/203
6,256,391 B1 *  7/2001  Ishiguro et al. ............ 380/203
6,360,320 B1 *  3/2002  Ishiguro et al. ............ 713/164
6,385,726 B1 *  5/2002  Hasebe et al. .............. 713/182

FOREIGN PATENT DOCUMENTS

JP          9-275551         10/1997
JP          10-41909          2/1998

* cited by examiner

Primary Examiner—Douglas Olms
Assistant Examiner—Brian Nguyen
(74) Attorney, Agent, or Firm—Finnegan, Henderson, Farabow, Garrett & Dunner, L.L.P.

(57) ABSTRACT

Region or field data corresponding to digital contents contained in a stream is embedded in the header field of the stream transmitted from a data output system. A data processing system controls grant/denial of partial processing in correspondence with the contents in the stream data on the basis of the region or field data embedded in the header field of the data packet in place of limiting the entire stream. Hence, the contents that each receiving system can deal with can be flexibly controlled without requiring any control for changing the stream to be transmitted in accordance with the branch structure of a title.

3 Claims, 9 Drawing Sheets

STREAM DATA PROCESSING SYSTEM AND STREAM DATA LIMITING METHOD

BACKGROUND OF THE INVENTION

This application is based on Japanese Patent Application No. 10-108119, filed Apr. 17, 1998, the contents of which are incorporated herein by reference.

In recent years, along with advance of the computer technology, various kinds of multimedia compatible electronic devices such as digital video players, set-top boxes, TVs, personal computers, and the like have been developed.

Such electronic device can play back digital contents such as a movie stored in a DVD (Digital Versatile Disk), a TV program transmitted by a digital satellite broadcast, and the like.

It is a common practice to encode digital contents by moving image high-efficiency coding called MPEG2, and to then send them to homes via recording media or transmission media. MPEG2 coding is based on the principle of variable rate coding to assure both high image quality and a short recording time in relation to the capacity. The volume of data encoded by variable rate coding depends on the image quality of a source image, and increases as the scene includes faster motions. Hence, digital contents can provide a video with image quality as high as an original video.

Recently, in view of protection of the copyrights of such digital contents, the need for copy protection techniques for preventing their illicit copies has been advocated, but no effective schemes have been configured yet.

For this reason, CPTWG (Copy Protection Technical Working Group) is now preparing for new copy protection specifications designed for an IEEE1394 serial bus as the next-generation bus interface suitable for multimedia data transmission (to be referred to as an IEEE1394 copy protection technique hereinafter).

The IEEE1394 serial bus is the next-generation bus interface, which connects a digital video player, set-top box, TV, personal computer, and the like, and supports two different transfer modes, i.e., an asynchronous subaction and isochronous subaction. The former mode is called an asynchronous transfer mode, and is used upon transferring data that does not require real-time processing. The latter mode is an isochronous transfer mode that guarantees a transfer band, and can transfer digital contents represented by video data and audio data in real time.

As the IEEE1394 copy protection technique, digital contents which are exchanged among devices such as a digital video player, set-top box, TV, personal computer, and the like via the IEEE1394 serial buses may be enciphered or encrypted using known enciphering techniques such as a public key system, common key system, and the like so as to prevent their illicit copies.

However, since a personal computer is by nature an open system, satisfactory protection against illicit copies cannot be expected by merely enciphering data that flow on the IEEE1394 serial bus.

More specifically, if an enciphering/deciphering function is provided to a 1394 bridge in a personal computer, the open architecture of a PCI bus can be maintained, but deciphered data (plain contents) flow on the PCI bus and can be easily copied.

For this reason, a new system that can encipher digital contents transferred on the PCI bus must be built.

However, when such system is built, since the copy protection technique for digital contents basically limits transfer (copy) of the entire stream data made up of digital contents in correspondence with the type of digital contents (copy once, copy never, copy freely), it is impossible to realize flexible control for partially limiting digital contents that can be handled in correspondence with their contents.

Like in DVD, it is recently required in transfer control of stream data to impose limitations not only on the entire stream data but also on its portion. For example, transfer is granted only when a condition set by the user is satisfied (parental control) or in a predetermined region (region control).

However, parental control or region control in DVD is implemented by setting in advance a branch structure in a title recorded on a DVD medium. Hence, no problem is posed in case of a system which can individually designate data contents to be provided in units of users, but such control cannot be applied to a system which must transmit an identical stream to many unspecified persons such as stream data of a TV program of a satellite broadcast.

BRIEF SUMMARY OF THE INVENTION

It is an object of the present invention to provide a data processing system which can flexibly control limitations on stream data that can be dealt with, and a stream data limiting method applied to the system.

In order to achieve the above object, according to the present invention, in a stream data processing system for receiving and processing stream data, field data indicating a field of contents contained in the data stream is embedded in a header field of a data packet that forms the stream data, and the system comprises limiting means for controlling grant/denial of processing of the stream data in units of partial data that make up the stream data on the basis of the field data contained in the received stream data.

In this stream data processing system, by checking a coincidence or the like between field data embedded in the header field of a data packet and that set in advance in the system by the user, grant/denial of processing can be partially controlled in correspondence with the contents in stream data in place of limiting the entire stream data. Hence, each receiving system can flexibly control the contents that the system can deal with without requiring any control for changing the stream to be transmitted in accordance with the branch structure of a title. For example, even when the present invention is applied to stream data for a digital broadcast such as satellite, ground wave, cable TV, and the like for many unspecified persons, flexible limitations on processing data can be easily realized.

In place of or in addition to the field data, region data for specifying a region where the contents can be used may be embedded in the packet header field.

When the present invention is applied to a system which protects the copy right of digital contents by enciphering and exchanging stream data between a plurality of devices, control that allows a receiving device to process only contents of a type which matches the field or region designated by the user among the types (copy once, copy never, copy freely) of digital contents that the receiving device can deal with can be made. In this way, for example, when stream data for a digital broadcast is recorded on a device such as a digital VCR or the like, the recording contents can be limited.

As described above, according to the present invention, grant/denial of processing can be partially controlling on the basis of region or field data embedded in the header field of a data packet in place of limiting the entire stream data.

Consequently, contents that each receiving system can deal with can be flexibly controlled without requiring any control for changing the stream to be transmitted in accordance with the branch structure of a title. For example, even when the present invention is applied to stream data for a digital broadcast such as satellite, ground wave, cable TV, and the like for many unspecified persons, flexible limitations on processing data can be easily realized.

When the present invention is applied to a system which protects the copy right of digital contents by enciphering and exchanging stream data between a plurality of devices, control that allows a receiving device to process only contents of a type which matches the field or region designated by the user among the types (copy once, copy never, copy freely) of digital contents that the receiving device can deal with can be made. In this way, for example, when stream data for a digital broadcast is recorded on a device such as a digital VCR or the like, the recording contents can be limited.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The preferred embodiment of the present invention will be described hereinafter with reference to the accompanying drawings.

Figure 1:
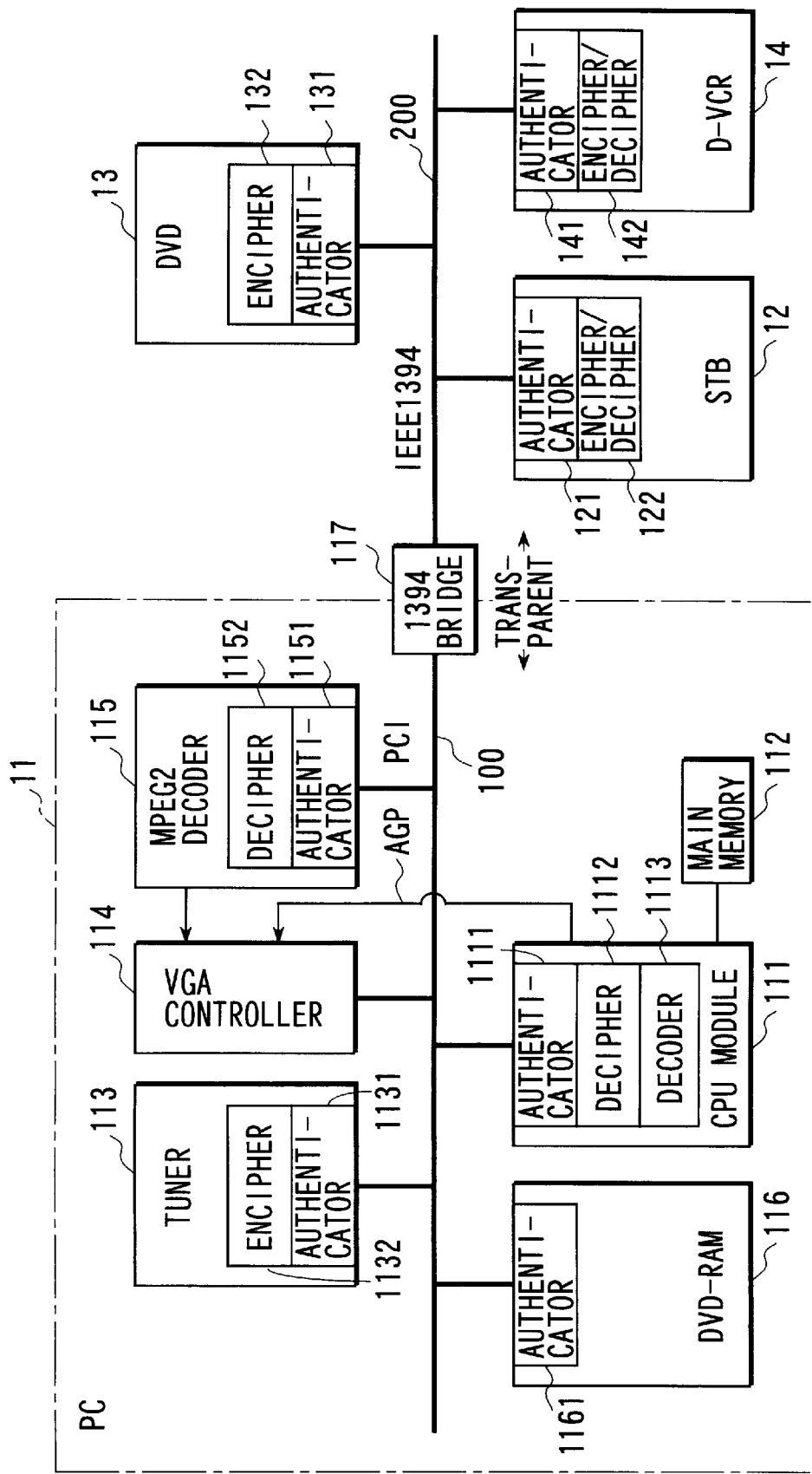
FIG. 1 is a block diagram showing the system arrangement of a computer system according to an embodiment of the present invention.

FIG. 1 shows the system arrangement of a personal computer (to be abbreviated as a PC hereinafter) according to an embodiment of the present invention. The PC 11 can communicate with external consumer electronic devices such as a set-top box (STB) 12, a digital video camera or DV camcorder (DVC) 13, and a digital video cassette recorder (D-VCR) 14 via an IEEE1394 serial bus 200, as shown in FIG. 1.

The set-top box (STB) 12, digital video camera (DVC) 13, and digital video cassette recorder (D-VCR) 14 respectively have authenticators 121, 131, and 141 in their interfaces with the IEEE1394 serial bus 200 to support the IEEE1394 copy protection technique. The set-top box (STB) 12 and digital video cassette recorder (D-VCR) 14, which exchange digital contents, respectively have encipher/decipher units 122 and 142 having both enciphering and deciphering functions. On the other hand, the digital video camera (DVC) 13 which only transmits digital contents has a decipher unit 132 alone.

Digital contents to be exchanged among the PC 11, set-top box (STB) 12, digital video camera (DVC) 13, and digital video cassette recorder (D-VCR) 14 are transferred on the IEEE1394 serial bus 200 as enciphered data.

As shown in FIG. 1, the PC 11 is constructed by a PCI bus 100, and a plurality of function modules connected thereto. Among these function modules, those which deal with digital contents, i.e., a CPU module 111, satellite or digital TV tuner 113, MPEG2 decoder 115, and DVD-RAM drive 116 respectively have authenticators 1111, 1131, 1151, and 1161 for authenticating devices and exchanging keys in their interfaces with the PCI bus 100. The functions of these authenticators 1111, 1131, 1151, and 1161 are basically the same as those of the set-top box (STB) 12, digital video camera (DVC) 13, and digital video cassette recorder (D-VCR) 14 that are 1394 devices, and perform authentication and key exchange required for enciphering and exchanging digital contents.

The interfaces of these CPU module 111, tuner 113, and MPEG2 decoder 115 also have one or both a decipher unit for deciphering enciphered contents or an encipher unit. Whether each module has one or both the encipher and decipher units is determined depending on the functions of the function modules. In this embodiment, the tuner 113 has an encipher unit 1132, and the CPU module 111 and MPEG2 decoder 115 respectively have decipher units 1112 and 1152.

The CPU module 111 is made up of a microprocessor, memory controller, PCI bus bridge, and the like, and can incorporate the authenticator 1111 and decipher unit 1112 as part of, e.g., the PCI bus bridge. The authenticator 1111, decipher unit 1112, and MPEG2 decoder 1113 in the CPU module 111 may be implemented by software.

The DVD-RAM drive 116 is provided as an auxiliary storage device of the PC 11, and is connected to the PCI bus 100 via an IDE interface, ATAPI interface, or the like. The DVD-RAM drive 116 has the authenticator 1161 alone, but has neither a decipher unit nor encipher unit. This is because enciphered digital contents are recorded on a DVD-RAM in the DVD-RAM drive 116 as enciphered data.

The PC 11 also has a 1394 bridge 117 which connects the PCI bus 100 and IEEE1394 serial bus 200 in two ways. The 1394 bridge 117 includes none of an authenticator, and encipher and decipher units, and enciphered digital contents are transferred from the PCI bus 100 to the IEEE1394 serial bus 200 or vice versa as enciphered data. In this manner, the 1394 bridge 117 transparently connects the function modules in the PC 11 and the 1394 devices.

The processing sequence upon decoding digital contents transferred from the DVC 13 on the IEEE1394 serial bus 200 in the CPU module 111 by software will be explained below.

The DVC 13 and CPU module 111 authenticate each other to see if they are authentic devices having a copy protection function. The device authentication can be implemented using a known method such as random challenge & response, a method using a one-way hash function, a method using a time variable key which changes every time using a random number, and the like. The types of contents that a partner device can deal with are authenticated using a system ID. The system ID is embedded in a circuit or firmware of each of 1394 devices and the respective function modules in the PC 11. Based on the system ID, it is determined if a device can deal with all the types of digital contents, i.e., copy once, copy never, and copy freely contents, or with only copy once or copy freely digital contents.

In this authentication, the CPU module 111 performs key exchange with the DVC 13 to generate a key for deciphering enciphered contents. Since the authenticator is located within the CPU module 111, the key itself or data for generating the key is transferred from the DVC 13 to the CPU module 111 via the 1394 bus 200 and PCI bus 100 as enciphered data.

The DVC 13 enciphers digital contents, and sends them to the CPU module 111. The enciphered contents arrive at the CPU module 111 via the 1394 bus 200 and PCI bus 100 as enciphered data, and the decipher unit 1112 in the CPU module 111 deciphers the enciphered contents using a key obtained by authentication. When the authenticator and decipher unit in the CPU module 111 are implemented by software, a means for preventing that software from being altered or the algorithm from being disclosed must be taken.

The deciphered contents are decoded by the software MPEG2 decoder 1113 in the CPU module 111, and are sent to a VGA controller 114 via an AGP (Accelerated Graphics Port) that directly connects a main memory 112 and the VGA controller 114. The decoded contents are then played back by the VGA controller 114.

As described above, the authenticators and encipher units and/or decipher units are prepared in the respective interfaces of the plurality of function modules that deal with digital contents, and upon exchanging digital contents to be copy-protected between function modules or between the function module and 1394 device, authentication and enciphering/deciphering of the digital contents are done between these devices. In this way, deciphering keys and digital contents are transferred on both the IEEE1394 bus 200 and PCI bus 100 as enciphered data, thus preventing illicit copies of the digital contents.

Since authentication can be done in units of function modules in the PC 11, the types (copy once, copy never, and copy freely) of digital contents that each function module can deal with can be efficiently limited in units of function modules.

Figure 2:
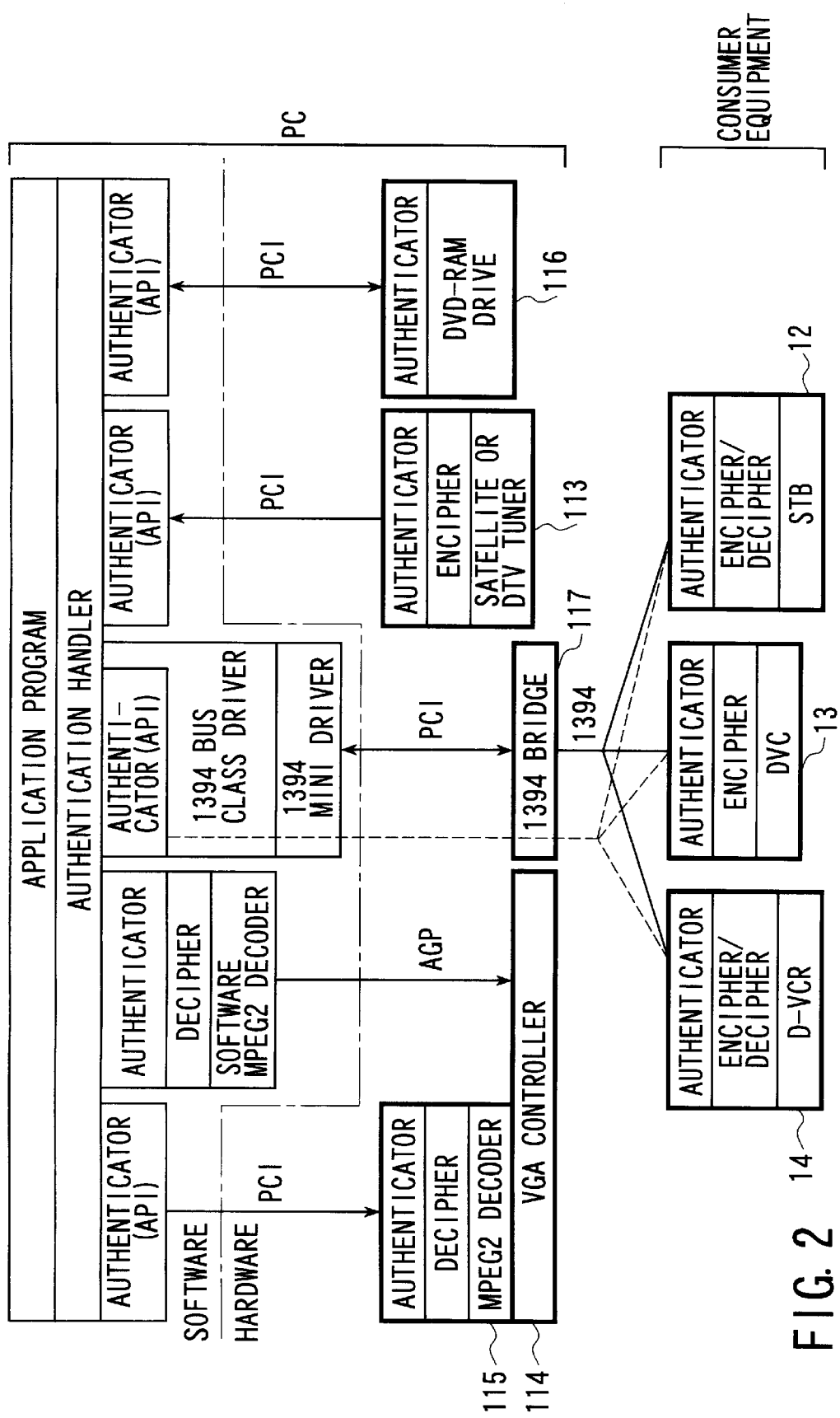
FIG. 2 is a diagram showing the relationship between software and hardware components in the system shown in FIG. 1.

FIG. 2 shows the relationship between software and hardware components in the system shown in FIG. 1.

Referring to FIG. 2, components above the one-dashed chain line are implemented by software, and those below the line are implemented by hardware. Vertically hierarchical blocks bounded by the bold frames are hardware devices such as the function modules in the PC 11, 1394 devices, and the like.

An authenticator handler makes control for authentication and key exchange with required hardware devices in response to a request from an application program such as digital contents playback software. As described above, since the 1394 bridge 117 transparently connects the individual function modules in the PC 11 and 1394 devices, the application program can equally handle the function modules in the PC 11 and 1394 devices without distinguishing them from each other, as indicated by the dotted lines, by installing the authentication and enciphering/deciphering protocols in the function modules in the PC 11 as in the 1394 devices.

Figure 3:
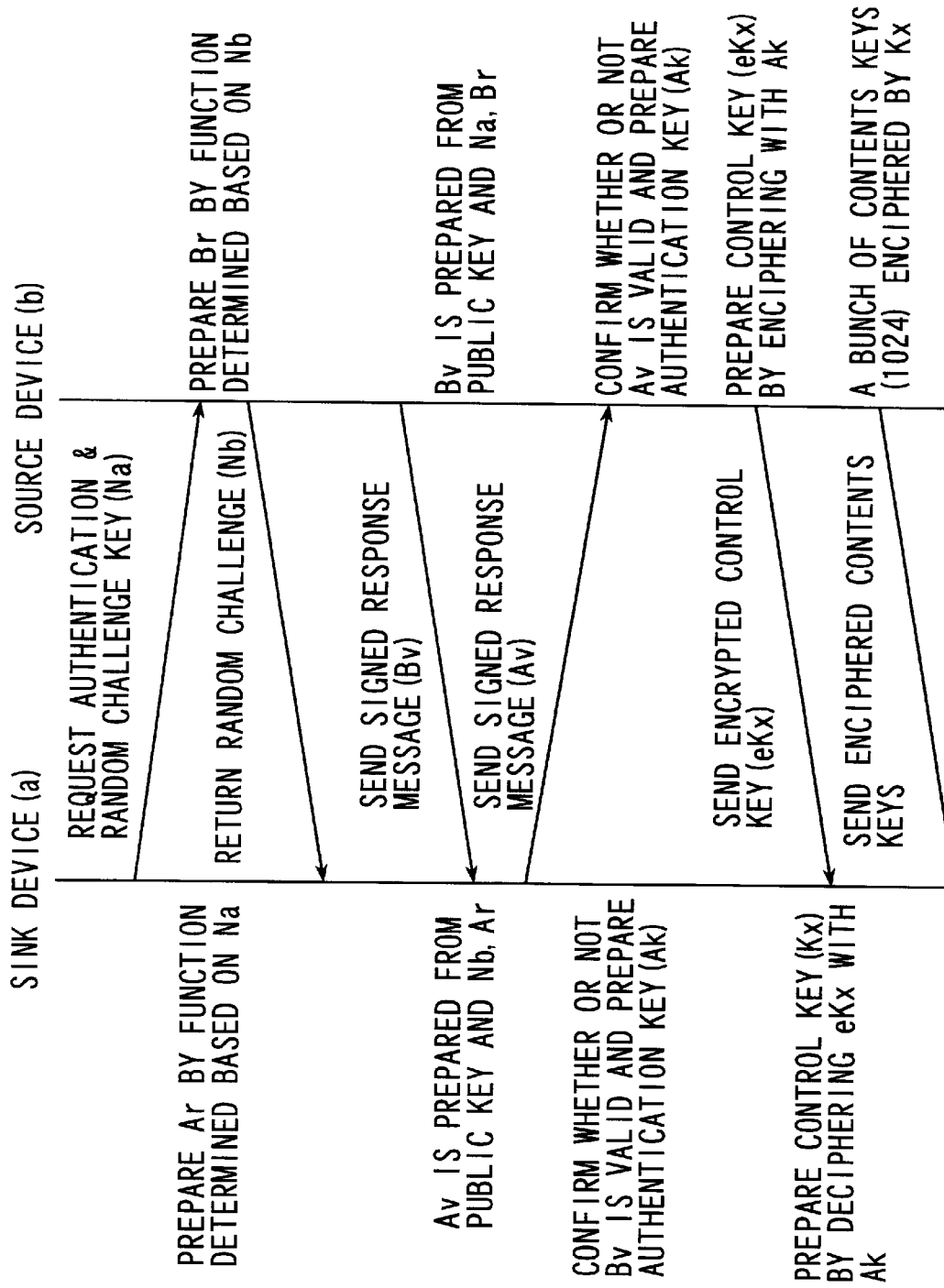
FIG. 3 is a chart showing an example of device authentication and key exchange in the system shown-in FIG. 1.

FIG. 3 shows an example of the authentication and key exchange procedures used in this embodiment. A device that transmits contents is indicated by Source Device, and a device that receives the contents is indicated by Sink Device.

Sink Device generates a random challenge key (Na), which changes every time, using a random number, and passes the random challenge key (Na) to Source Device together with an authentication request. Sink Device then generates Ar from Na using a predetermined function.

Source Device generates a random challenge key (Nb), which changes every time, using a random number, and sends back it as a response to the authentication request to Sink Device. Source Device generates Br from Nb using a predetermined function.

After that, Source device sends a message (Bv) to Sink Device. This message (Bv) is generated based on a public key, Na, and Br.

Sink Device sends a message (Av) to Source Device. This message (Av) is generated based on a public key, Nb, and Ar.

Source Device confirms if Av is valid. If Av is valid, Source Device determines that Sink Device is an authentic device, and generates an authentication key (Ak). Likewise, Sink Device confirms if Bv is valid. If Sink Device determines that Source Device is an authentic device, it generates an authentication key (Ak).

Source Device then sends a control key (eKx) enciphered by the authentication key (Ak) to Sink Device.

Sink Device deciphers the enciphered control key (eKx) using the authentication key (Ak) to generate a control key (Kx).

Furthermore, Source Device sends, as a time variable key, a bunch of contents keys (e.g., 1,024 keys) enciphered by Kx to Sink Device. Note that the time variable key varies along with time, and will be described in detail later.

Note that the authentication process shown in FIG. 3 is merely an example, and other known methods such as conventional random challenge & response and the like may be used as long as devices can authenticate each other to confirm if they are authentic devices, as described above.

A method of limiting the types of contents that each device can deal with in units of devices when the types (copy once, copy never, and copy free) of digital contents to be transferred are switched in real time will be explained below.

A device which can transmit copy never and copy once contents separately prepares two different control keys (those for deciphering enciphered deciphering keys) for copy never and copy once contents, and changes the number of control keys to be passed to the receiving device in correspondence with the functions of the receiving device. When the receiving device can deal with both the types (copy never and copy once) contents, authentication is done twice to acquire control keys for both the types of contents in advance. The transmitting device normally changes keys in correspondence with the types of contents. In this case, both the keys are prepared in advance on the receiving side by authentication to flexibly cope with dynamic switching of the types of contents.

Figure 4:
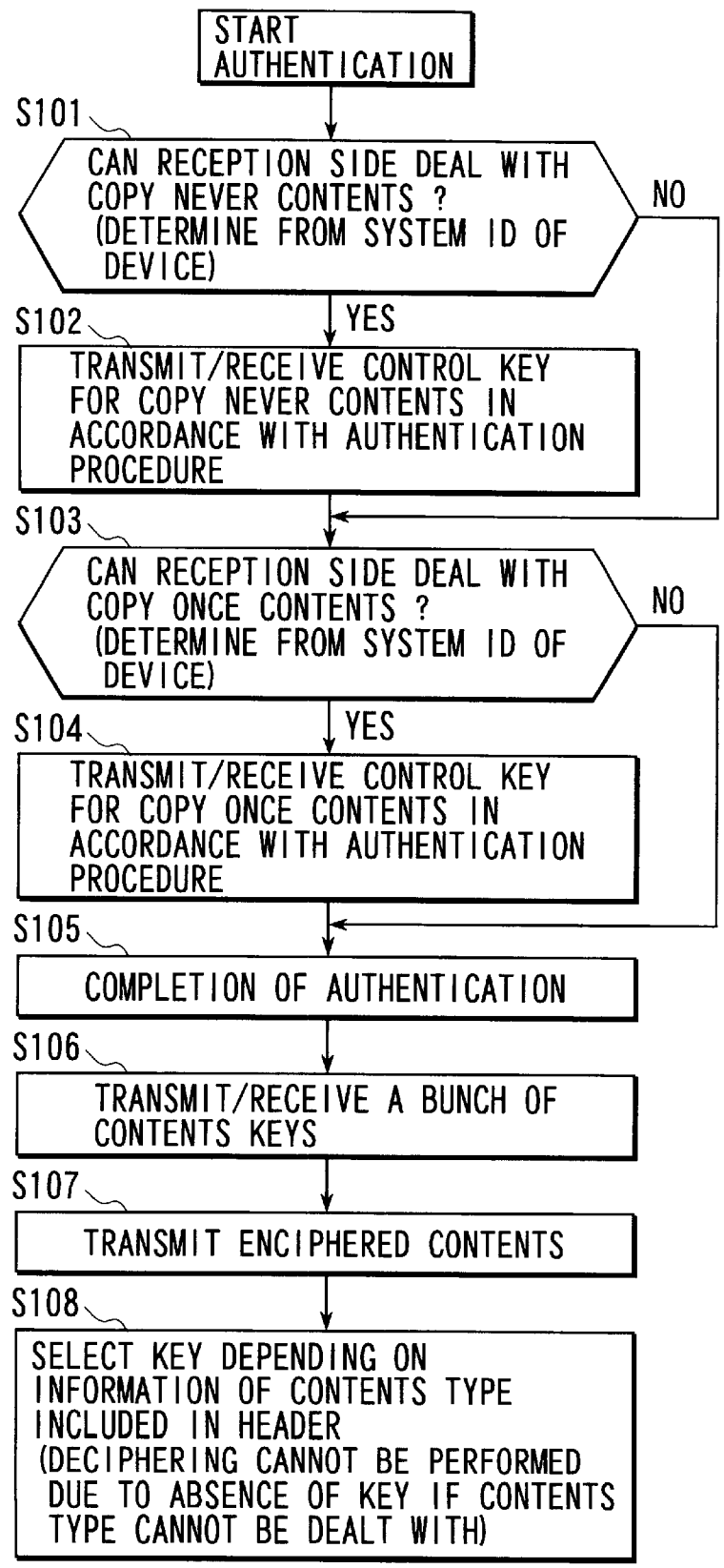
FIG. 4 is a flow chart showing an example of the authentication procedure used in the system of the embodiment shown in FIG. 1.

An example of the authentication process will be explained below with reference to the flow chart in FIG. 4.

The following processing is done in units of receiving devices as destinations of digital contents. The transmitting device acquires a system ID from each receiving device. The transmitting device checks based on the acquired system ID if that receiving device can deal with copy never contents (step S101). If the receiving device can deal with the copy never contents, the transmitting device transmits a control key (eKcontrol#1) for copy never contents to the receiving device, and the receiving device receives that control key (eKcontrol#1) for copy never contents (step S102). The transmitting device does not transmit any control key for copy never contents to a device which cannot deal with copy never contents.

The transmitting device then checks based on the system ID if that receiving device can deal with copy once contents (step S103). If the receiving device can deal with the copy once contents, the transmitting device transmits a control key (eKcontrol#2) for copy once contents to the receiving device, and the receiving device receives that control key (eKcontrol#2) for copy once contents (step S104). The transmitting device does not transmit any control key for copy once contents to a device which cannot deal with copy once contents.

These control keys (eKcontrol#1, eKcontrol#2) are obtained by enciphering keys for deciphering enciphered contents keys, and time variable keys using random numbers can be used. The receiving device deciphers eKcontrol#1 and eKcontrol#2 using random number values exchanged in the authentication or other keys prepared in advance in the device to obtain Kcontrol#1 and Kcontrol#2.

In this fashion, keys corresponding to the functions of each device are passed in units of receiving devices. That is, a device that can deal with both copy never and copy once contents receives control keys for both the types of contents via two authentication processes. On the other hand, a device that can deal with only copy once contents receives a control key for copy once contents alone.

Upon completion of authentication with all the receiving devices (step S105), a bunch (e.g., 1,024) of enciphered contents keys (eKcontent) and enciphered contents are broadcasted from the transmitting device to all the receiving devices (steps S106 and S107). In the header field of the enciphered contents, copy control data (CGMS) indicating one of copy never, copy once, and copy freely, and changing data of the contents keys that change along with time are embedded.

Figure 5:
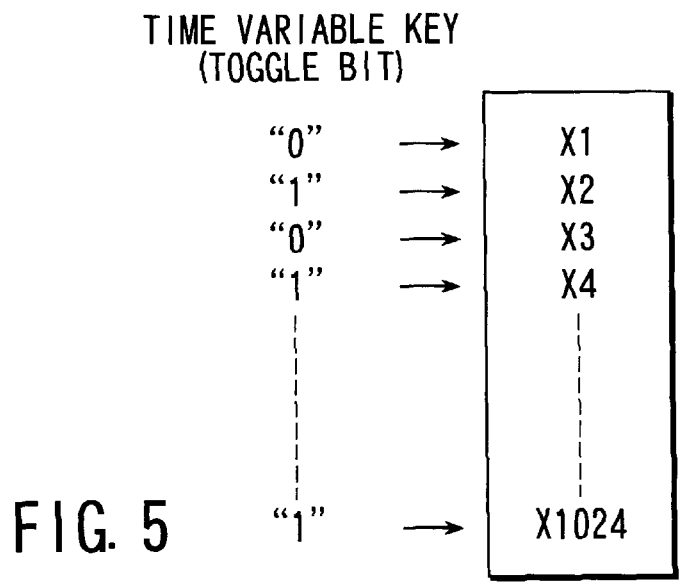
FIG. 5 is a view for explaining a time variable key.

Each receiving device uses the copy control data (CGMS) as contents identification data for dynamically changing the control keys. More specifically, each receiving device determines the type of contents which are being currently received in accordance with the copy control data (CGMS) contained in the enciphered contents, and selects a control key (Kcontrol) corresponding to the determined type of contents. Using the selected control key, the receiving device deciphers the enciphered contents key (eKcontent) to generate a contents key (Kcontent) for deciphering the enciphered contents (step S108). Upon receiving contents that a given receiving device cannot deal with, the receiving device has no corresponding control key (Kcontrol) and cannot decipher the contents. Note that the contents key may be changed in a given type of contents using the above-mentioned time variable key (changing data of the contents keys that change along with time) in place of dynamically changing the contents key in correspondence with different contents. In such case, a bunch of keys (1,024 keys) are sent from Source Device to Sink device in advance, and when Source Device changes the time variable key, Sink device changes the contents keys in accordance with a predetermined algorithm, as has been described above with the aid of FIG. 3. More specifically, as shown in FIG. 5, the time variable key consists of one toggle bit, and every time this bit changes from "0" to "1" or vice versa, 1,024 contents keys are changed.

As described above, in this embodiment, upon transmitting a stream containing a plurality of different types of contents, authentication is done in correspondence with the number of types of contents that each receiving device can deal with, and deciphering keys corresponding to the number of types of contents that the receiving device can process are passed to the receiving device.

Also, contents keys are changed along with time in a given type of contents.

Figure 6:
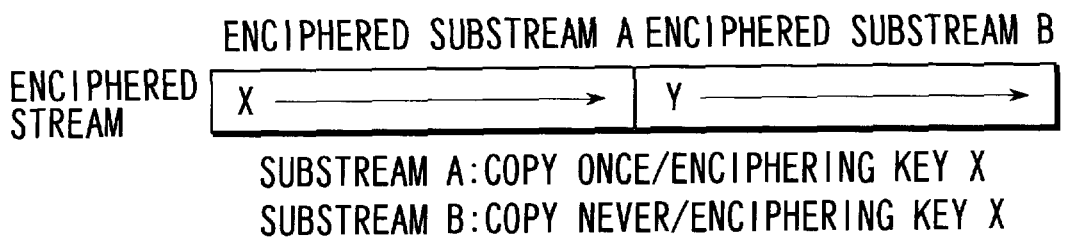
FIG. 6 is a view showing an example of the stream format of digital contents applied to the system of the embodiment shown in FIG. 1.

Assume that enciphered substream A containing copy once contents and enciphered substream B containing copy never contents are transmitted successively, as shown in, e.g., FIG. 6.

Figure 7:
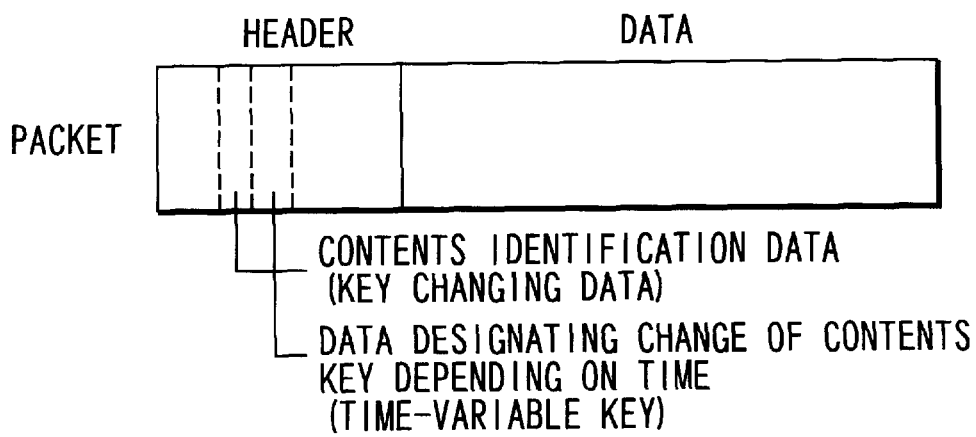
FIG. 7 is a view showing the packet header of digital contents appended with contents identification data, which are applied to the system of the embodiment shown in FIG. 1.

Contents identification data indicating the type of contents and data for changing contents keys along with the time are embedded as data for instructing to change a key to be used in the header field of each of enciphered substreams A and B, as shown in FIG. 7. As the contents identification data, the copy control data (CGMS) can be used, as described above.

When such enciphered stream is transmitted to both a device (device #1) that can deal with both copy never and copy once contents, and a device (device #2) that can deal with either copy once or copy freely contents, deciphering keys (contents keys) for both enciphered substreams A and B are passed to device #1, and only a deciphering key (contents key) for enciphered substream A is passed to device #2.

Figure 8A:
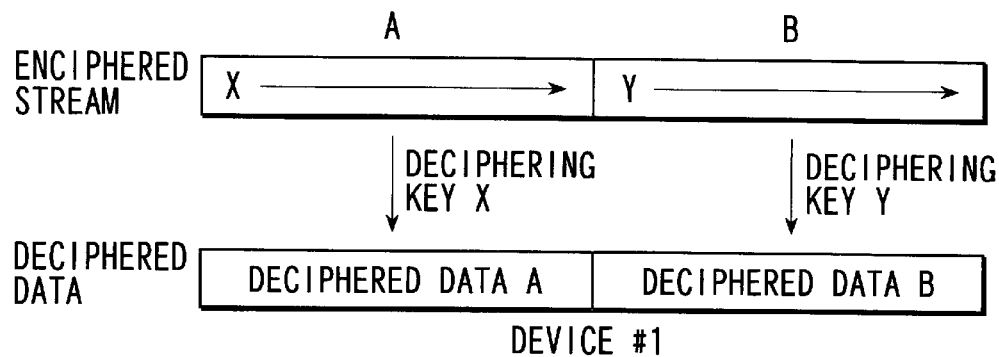
FIGS. 8A and 8B are views for explaining the principle of digital contents limitation applied to the system of the embodiment shown in FIG. 1.
Figure 8B:
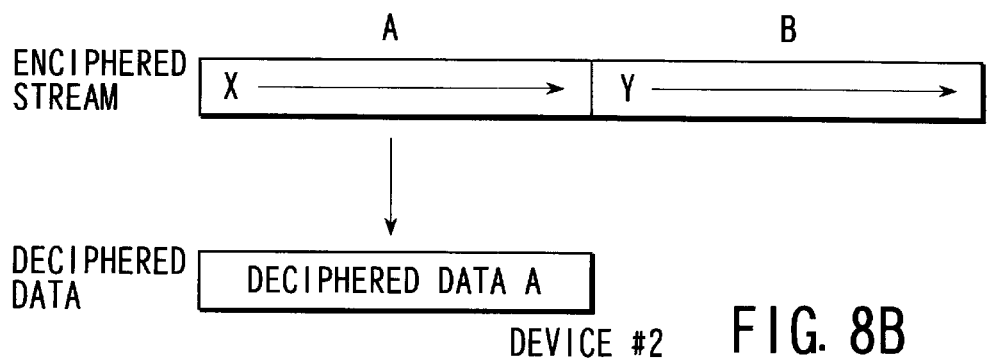

Hence, as shown in FIG. 8A, upon switching the contents type from enciphered substream A to enciphered substream B, device #1 dynamically changes the deciphering keys to obtain correct deciphered data (plaintext) respectively corresponding to enciphered substreams A and B. On the other hand, as shown in FIG. 8B, since device #2 has no key for deciphering enciphered substream B, it can obtain deciphered data (plaintext) corresponding to enciphered substream A but cannot decipher enciphered substream B.

In this embodiment, control keys corresponding to the functions of devices are passed in units of receiving devices. However, since it is important to control each receiving device to prepare for contents keys corresponding to its functions, various schemes may be used as that procedure depending on the authentication protocols used. Also, the arrangement in which authenticators and encipher/decipher units are provided in units of function modules is not limited to the PC but can also be applied to various other microcomputer applied devices such as a digital contents recording/playback player and the like.

Figure 9:
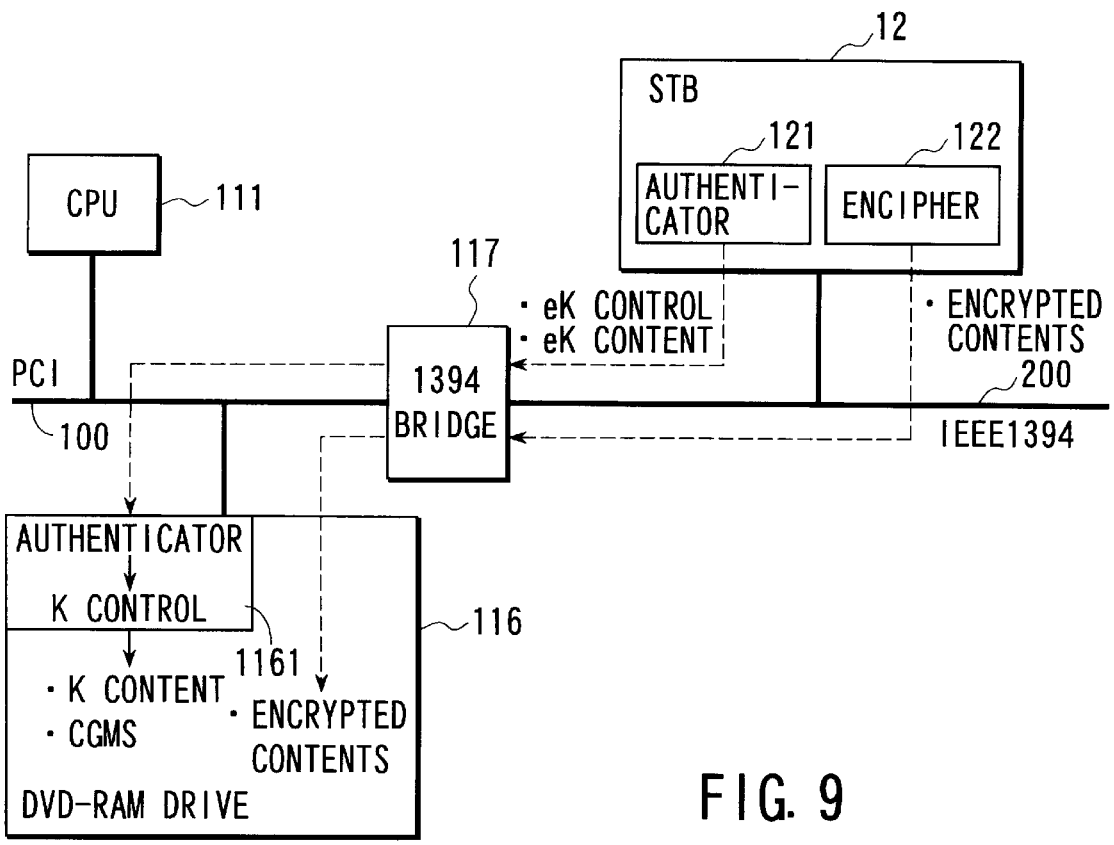
FIG. 9 is a diagram for explaining recording of contents on a storage device provided to the system of the embodiment shown in FIG. 1.

A method for recording contents in a storage device in the PC 11 shown in FIG. 1 will be explained below with reference to FIG. 9.

In general, since a storage device used as an auxiliary storage device in a personal computer has no authentication function, it cannot record contents that require copy protection. When authentication and deciphering functions are prepared, contents can be recorded on the storage device after they are deciphered. In this case in turn, the recording contents (plain contents) may be illicitly used. Removable storage devices using portable recording media are especially vulnerable to such illicit uses.

To prevent such illicit uses, in this embodiment, the authenticator alone is provided to the storage device to record the contents on a recording medium as enciphered data. In addition, a contents key generated by authentication is recorded on an area on the recording medium, which cannot be accessed by the system.

The recording method will be described in detail below taking as an example a case wherein copy once digital contents to be copy-protected are received from the STB 12 and are recorded on a DVD-RAM medium in the DVD-RAM drive 116.

1. Using the authenticators 121 and 1161 of the STB 12 and DVD-RAM drive 116, these devices authenticate each other. If it is confirmed that both parties are authentic, the DVD-RAM drive 116 deciphers an enciphered control key (eKcontrol) sent from the STB 12 to generate a control key (Kcontrol).

2. The STB 12 sends an enciphered contents key (eKcontent) to the DVD-RAM drive 116 together with enciphered digital contents.

3. The enciphered digital contents contain copy control data (CGMS).

4. The DVD-RAM drive 116 generates a contents key (Kcontent) from eKcontent using Kcontrol and CGMS. The key eKcontent is a time variable key.

Figure 10:
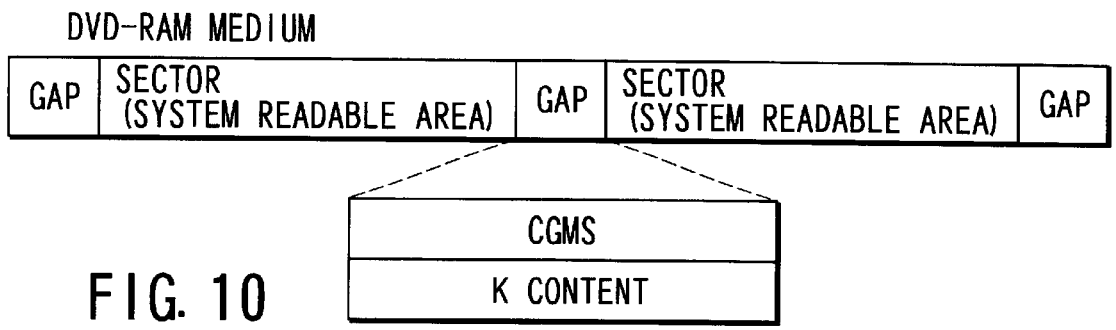
FIG. 10 is a view for explaining a key storage method in the storage device provided to the system of the embodiment shown in FIG. 1.

5. The enciphered or encrypted contents encrypted by Kcontent are directly recorded on the medium, and the corresponding Kcontent is recorded on a gap area between neighboring sectors, as shown in, e.g., FIG. 10. Also, the contents of CGMS are rewritten from "copy once" to "copy no more", and the written CGMS is similarly recorded on this gap area. The gap area can be accessed by the drive but cannot be accessed by the system.

Note that these procedures are controlled by the CPU module 111.

The playback process of the encrypted contents recorded on the DVD-RAM medium will be explained below with reference to FIG. 11.

1. The DVD-RAM drive 116 and MPEG2 decoder 115 authenticate each other.

2. If it is confirmed that both parties are authentic, the DVD-RAM drive 116 sends an enciphered control key (eKcontrol) to the MPEG2 decoder 115.

3. The authenticator 1151 in the MPEG2 decoder 115 deciphers eKcontrol to generate Kcontrol.

4. The DVD-RAM drive 116 sends an enciphered contents key (eKcontent) and CGMS to the MPEG2 decoder 115 together with encrypted contents.

5. The authenticator 1151 in the MPEG2 decoder 115 deciphers eKcontent using Kcontrol and CGMS to generate Kcontent.

6. Kcontent is sent to the decipher unit 1152 in the MPEG2 decoder 115.

7. The decipher unit 1152 deciphers the encrypted contents using the contents key to generate plaintext of the contents.

8. The MPEG2 decoder 115 decodes the plaintext and sends it to the video input port of the VGA controller 114, thus displaying the data on the screen.

As described above, the authenticator for device authentication is provided to the interface of the storage device to directly record received enciphered contents. In this way, copy once contents, which cannot be recorded in the conventional system, can be recorded on the storage device. Since the received contents are recorded as enciphered data, the need for a decipher circuit for deciphering the contents can be obviated. Furthermore, since the deciphered contents deciphering key is written in the area which cannot be read out by the system, an authentic device alone can decipher the storage contents of the storage device via authentication with that storage device.

On the other hand, various titles may be distributed using computer-readable recording media in each of which enciphered digital contents are recorded on a normal area, and a deciphering key is recorded on an area that cannot be read out by the system. In this fashion, only an authentic device having authentication and enciphering/deciphering functions can play back the contents of that recording medium, thus preventing illicit copies.

Note that this embodiment has exemplified the DVD-RAM drive as a storage device, but may be applied to a DVD-R drive, MO drive, HDD, and the like. The storage device with the authentication function can also be applied to various other microcomputer applied devices using a storage device capable of read/write such as a hybrid device of a DVD player and D-VCR, and the like, in addition to the PC. Also, such storage device can be implemented as an IEEE1394 device.

A data transfer limitation scheme for limiting a device that can deal with enciphered contents to be transferred using the attributes (field, region) of the contents will be explained below.

That is, the scheme for limiting devices on the basis of copy control data indicating copy never, copy once, and copy freely that each device can deal with has been described. This scheme is control for the entire stream containing a single type of contents. Therefore, it is hard to flexibly control to allow a device to deal with only a portion that matches a specific condition in the contents that the device can deal with.

In the data transfer limitation scheme of this embodiment, field or region data indicating the contents of data is embedded in the header field of stream data. Using the field or region data, the user can access only a portion that matches a predetermined condition (field or region) in a stream having contents of a given type that his or her device is authorized to deal with, and is prohibited from accessing other portions in that stream.

Figure 12:
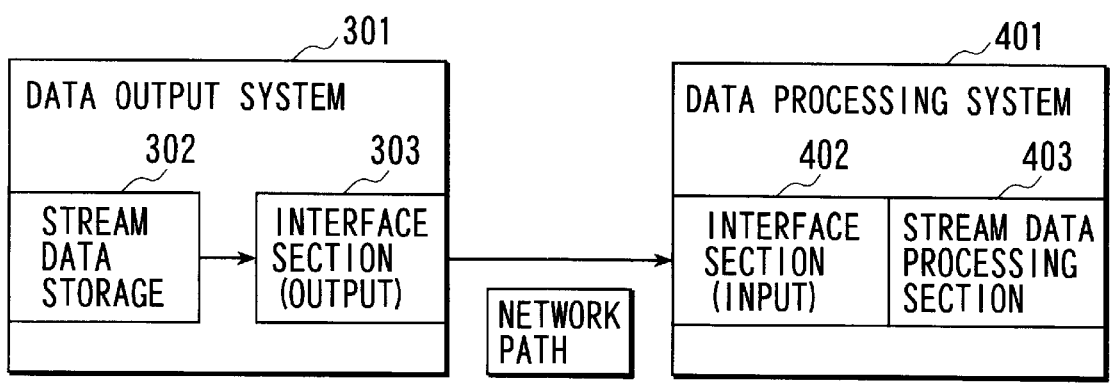
FIG. 12 is a diagram for explaining the principle of a data transfer limitation scheme applied to the system of the embodiment shown in FIG. 1.

FIG. 12 shows the system arrangement that implements the data transfer limitation scheme of this embodiment.

Transfer control in accordance with field data appended to the packet header field of stream data will be explained first.

Note that "field" means classification that is socially and educationally required such as the presence/absence and degrees of sexual and violent expressions, and the like.

Stream data is packetized upon passing a network path, and each packet is made up of a header having information of data, and the data itself. Note that this header can be either a header defined by the network path or a header field contained in data.

Figure 13:
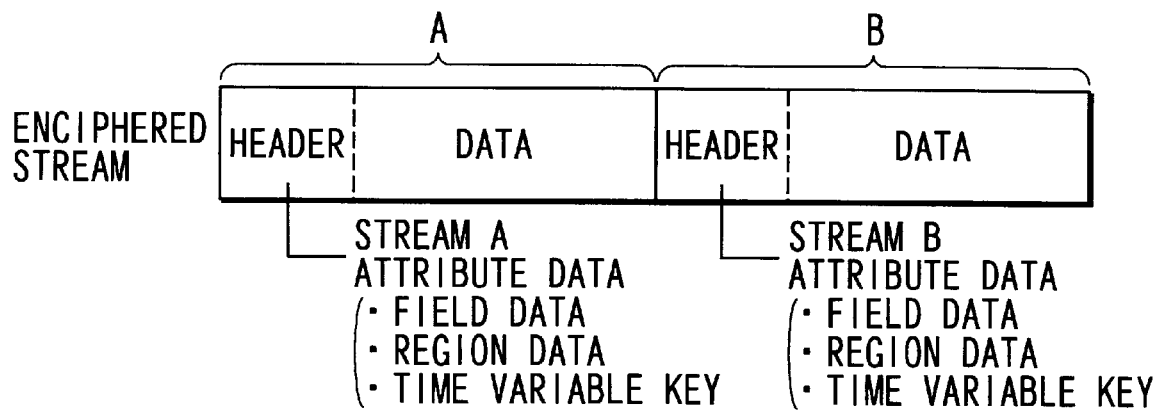
FIG. 13 is a view showing an example of the structure of stream data used in the data transfer limitation scheme shown in FIG. 12.

A data output system 301 is constructed by a stream data storage 302 and interface 303 for externally outputting the stream data. This system generates a data packet to be output onto the network path. "Field" data is stored in the header of that packet, as shown in FIG. 13. Note that the header field also contains the aforementioned time variable key, i.e., data for directing to change the contents key along with time. The network can be either wired or wireless. Also, the network may be the IEEE1394 serial bus 200, PCI bus 100, and the like shown in FIG. 1.

A data processing system 401 is located inside an apparatus that receives the stream data. For example, in the PC 11 shown in FIG. 1, the tuner 113, CPU module 111, MPEG2 decoder 115, or the like correspond to the data processing system 401. The data processing system 401 is not limited to the PC components but may be the 1394 devices shown in FIG. 1, or a satellite or internet terminal.

The data processing system 401 executes processing for actually presenting data to the user, and is constructed by an interface section 402 that receives data, and a stream data processing section 403 for processing. More specifically, the "field" data is interpreted not at the reception timing of data but at the processing timing of the data itself, and is compared with a field defined by system attribute data set in advance by, e.g., the user of the data processing system 401 to determine whether or not processing of the data is granted in units of data packets.

Note that the interface section may be implemented by one or both of hardware and software.

In the stream data, "region" data for specifying a region where the corresponding contents can be processed may be embedded in place of or in addition to the "field" data. Note that "region" is classified in accordance with the intention of the producer or distributor of stream data. In this case as well, the "region" data is interpreted not at the reception timing of data but at the processing timing of the data itself, and is compared with a region defined by system data of the data processing system 401 to determine whether or not processing of the data is granted in units of data packets.

Figure 14:
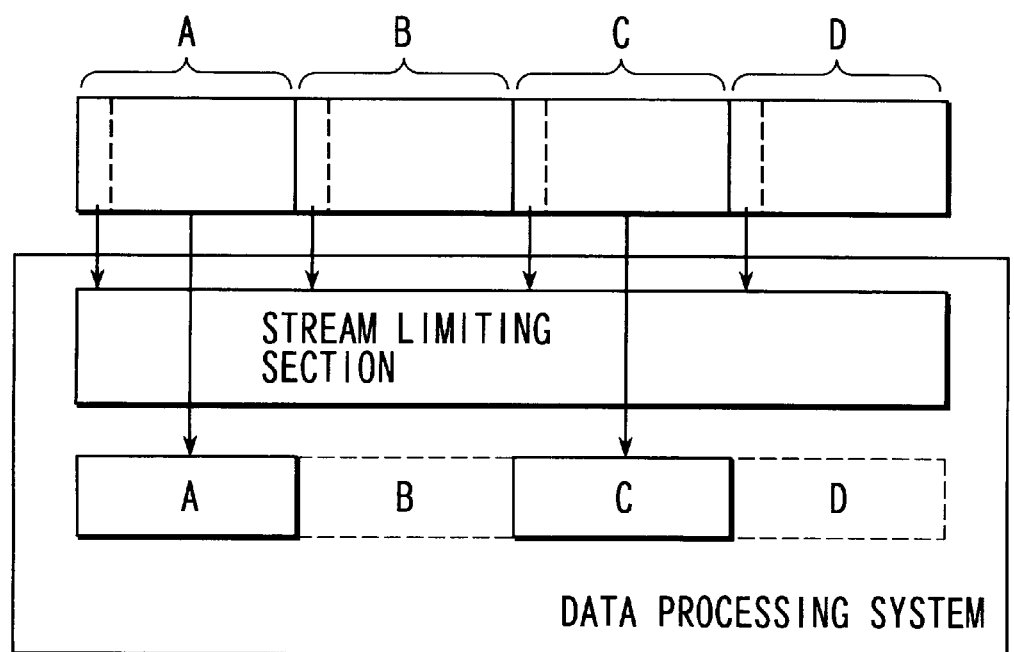
FIG. 14 is a view showing data limitation by the data transfer limitation scheme shown in FIG. 12.

FIG. 14 shows the process for controlling grant/denial of data processing depending on stream attribute data such as "field", "region", and the like embedded in the packet header of a stream.

FIG. 14 shows a case wherein digital contents of a type that the data processing system 401 can deal with are made up of data packets A, B, C, and D, and "field" or "region" data is contained as stream attribute data in the header of each data packet.

Figure 15:
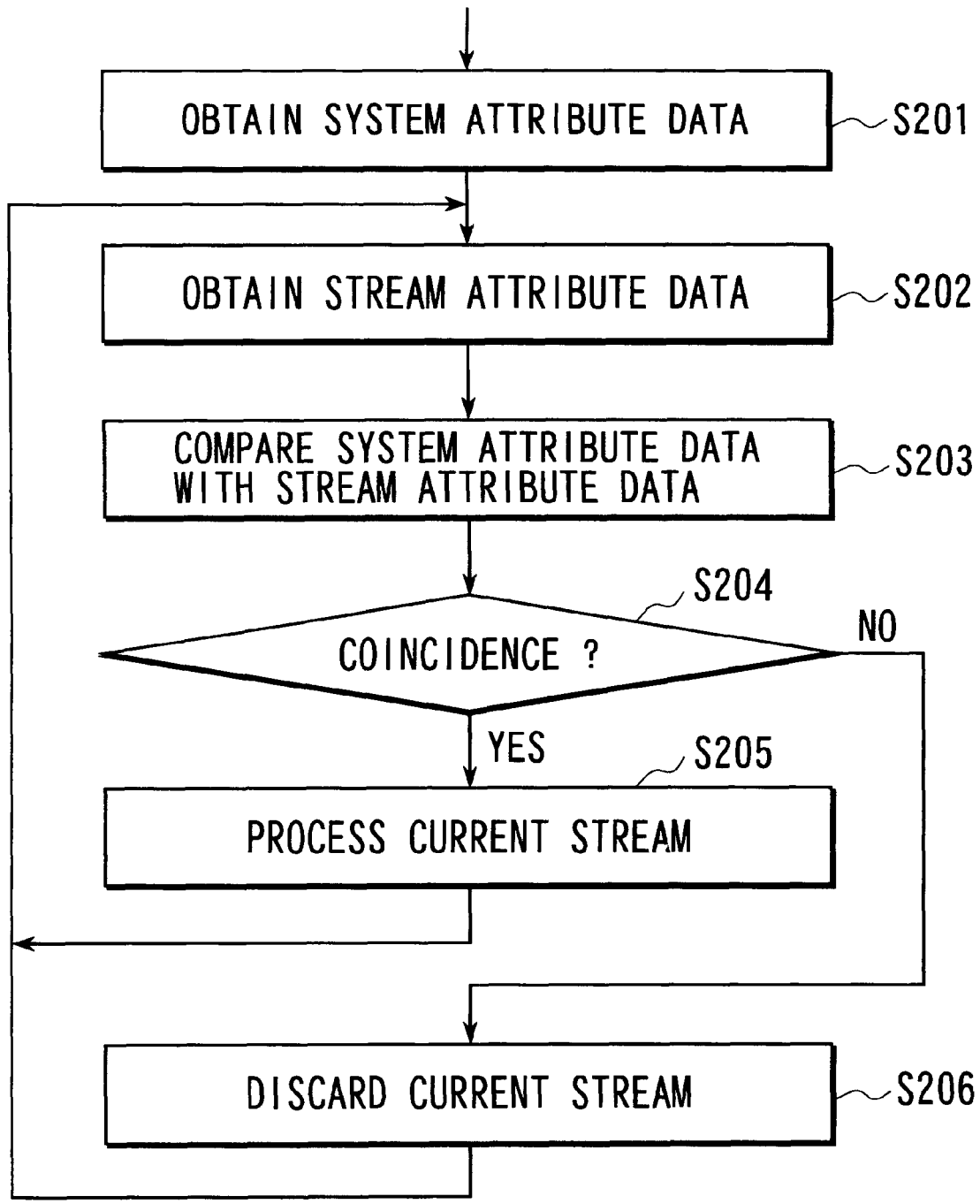
FIG. 15 is a flow chart showing the processing sequence of the data transfer limitation scheme shown in FIG. 12.

The stream limiting function of the data processing system 401 processes only data of "field" or "region" (data A and C) that match the data processing system 401, and excludes and discards other data (data B and D) from those to be processed. The processing of the stream limiting function is implemented by the sequence shown in the flow chart in FIG. 15. More specifically, system attribute data set in the data processing system 401 is obtained, and is compared with stream attribute data contained in the packet header of the received stream (steps S201 to S204). If these attribute data coincide with each other, that stream (packet) is processed (step S205); otherwise, the stream is not processed (step S206).

Hence, when the stream limiting function of the data processing system 401 is added to the MPEG2 decoder 115 shown in FIG. 1, the decoder 115 decodes and plays back only data (data A and C) that match the "field" or "region" set by the user among video contents (data A, B, C, and D) transferred successively, but neither decodes nor plays back other data (data B and D). That is, after data A is played back, the playback period of data B becomes a blanking period, and upon completion of playback period of data B, data C is played back.

Figure 11:
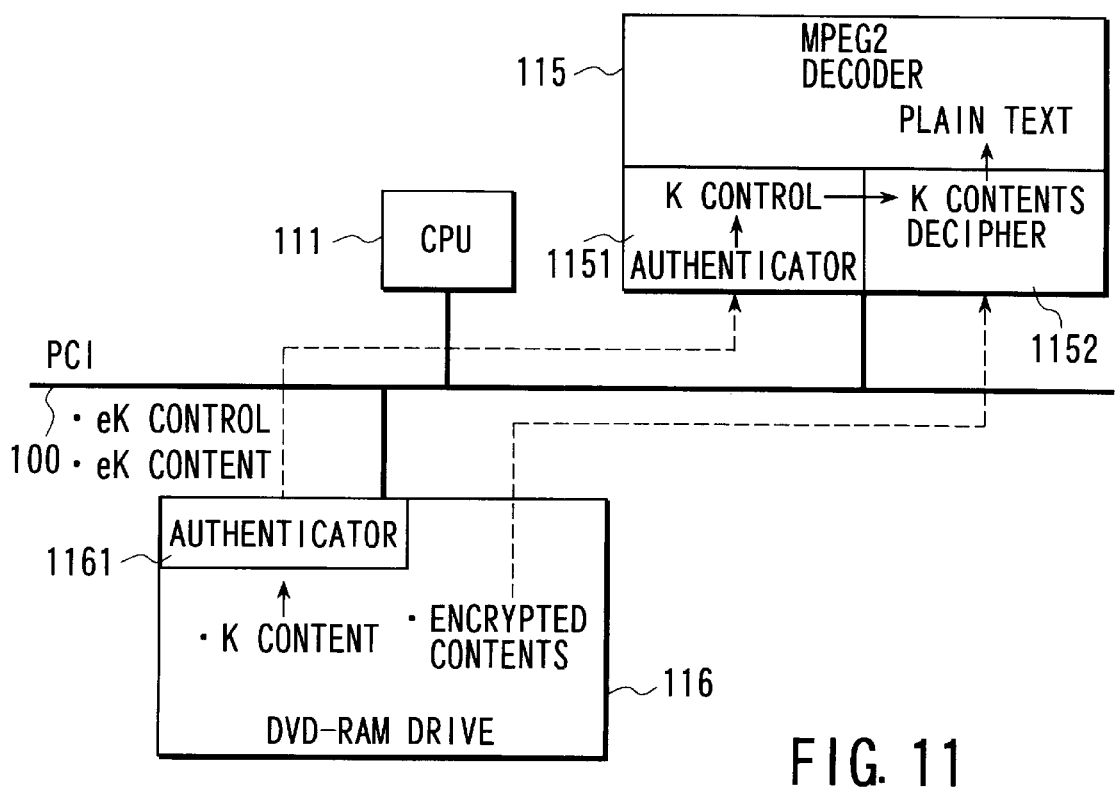
FIG. 11 is a diagram for explaining the playback process of contents recorded on the storage device provided to the system of the embodiment shown in FIG. 1.

Therefore, when the system arrangement shown in FIG. 11 is applied to a contents provider system such as a satellite broadcast for many unspecified persons, only scenes that match each user condition can be played back or recorded. In this way, flexible control for allowing a device to process only a portion matching a specific condition among the contents of a type that the device can deal with can be easily realized.

In the embodiment shown in FIG. 1, the authenticators provided in the function modules 111, 113, 115 and 116, respectively are implemented by hardware. However, the authenticators may be implemented as device drivers for the modules 111, 113, 115, and 116, respectively.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A stream data processing system for receiving and processing stream data, comprising:
    means for embedding field data in a header field of a data packet to form stream data wherein the field data indicates a classification of the data packet that is socially or educationally determined;
    means for setting desired field data; and
    limiting means for controlling grant and denial processing of the stream data in units of the data packet based on a comparison between the desired field data and the field data contained in the data packet.

2. A system according to claim 1, wherein said stream data comprises enciphered data and processing of the stream data comprises deciphering processing.

3. A system according to claim 2, wherein
    said embedding means further embeds region data in the header field of the data packet, the region data indicating a region in which a processing of the data packet is granted; and
    said limiting means controls grant and denial processing of the stream data in units of the data packet further based on the region data contained in the data packet.

* * * * *